United States Patent
O'Connell, Jr. et al.

(10) Patent No.: US 11,317,632 B2
(45) Date of Patent: May 3, 2022

(54) MATERIALS AMD METHODS FOR BUFFERING ACTIVE CHLORINE SOLUTIONS

(71) Applicant: Pharmocon LLC, Ashland, MA (US)

(72) Inventors: John F O'Connell, Jr., Ashland, MA (US); James P Demers, Brooklyn, NY (US); Darryl C Rideout, Milford, PA (US)

(73) Assignee: Pharmocon LLC, Framingham, MA (US)

( * ) Notice: Subject to any disclaimer, the term of this patent is extended or adjusted under 35 U.S.C. 154(b) by 0 days.

(21) Appl. No.: 16/468,821

(22) PCT Filed: Jan. 17, 2018

(86) PCT No.: PCT/US2018/013997
§ 371 (c)(1),
(2) Date: Jun. 12, 2019

(87) PCT Pub. No.: WO2018/132846
PCT Pub. Date: Jul. 19, 2018

(65) Prior Publication Data
US 2019/0320658 A1 Oct. 24, 2019

Related U.S. Application Data

(60) Provisional application No. 62/445,754, filed on Jan. 13, 2017.

(51) Int. Cl.
*A01N 57/14* (2006.01)
*A01N 25/22* (2006.01)
*A01N 25/08* (2006.01)
*A01N 59/26* (2006.01)

(52) U.S. Cl.
CPC ............. *A01N 57/14* (2013.01); *A01N 25/08* (2013.01); *A01N 25/22* (2013.01); *A01N 59/26* (2013.01)

(58) Field of Classification Search
CPC ...................................................... A01N 57/14
See application file for complete search history.

(56) References Cited

U.S. PATENT DOCUMENTS 5,981,457 A * 11/1999 Ahmed .................... C11D 1/83
134/25.2
2005/0075263 A1 4/2005 Gomez
2012/0269904 A1 10/2012 Northey
2014/0134224 A1 5/2014 Mallet

* cited by examiner

*Primary Examiner* — Kyle A Purdy
(74) *Attorney, Agent, or Firm* — James P. Demers; Cittone Demers & Arneri LLP

(57) ABSTRACT

The invention provides buffers stable to oxidants, including chlorine and hypochlorous acid, which are usable in the pH range 3-7. The invention also provides stable, buffered solutions comprising hypochlorous acid, having a pH between 3 and 7, and disposable wiping articles impregnated with these solutions.

14 Claims, 10 Drawing Sheets

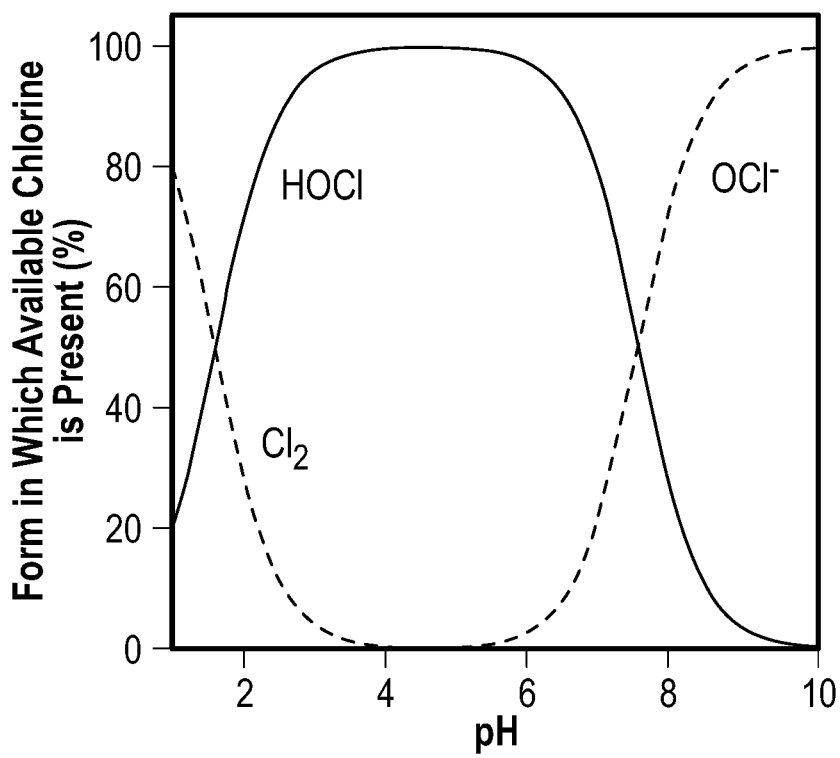
FIG. 1 [Prior Art]
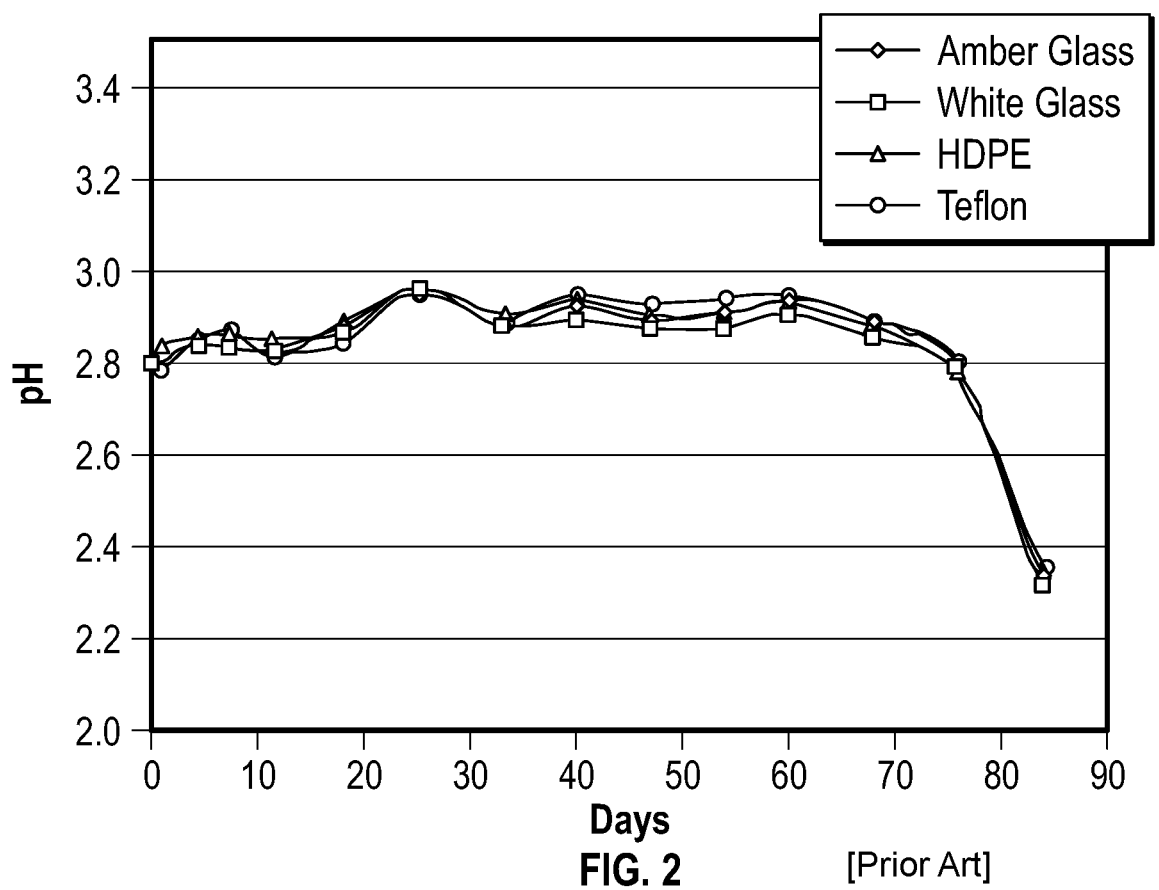
FIG. 2 [Prior Art]

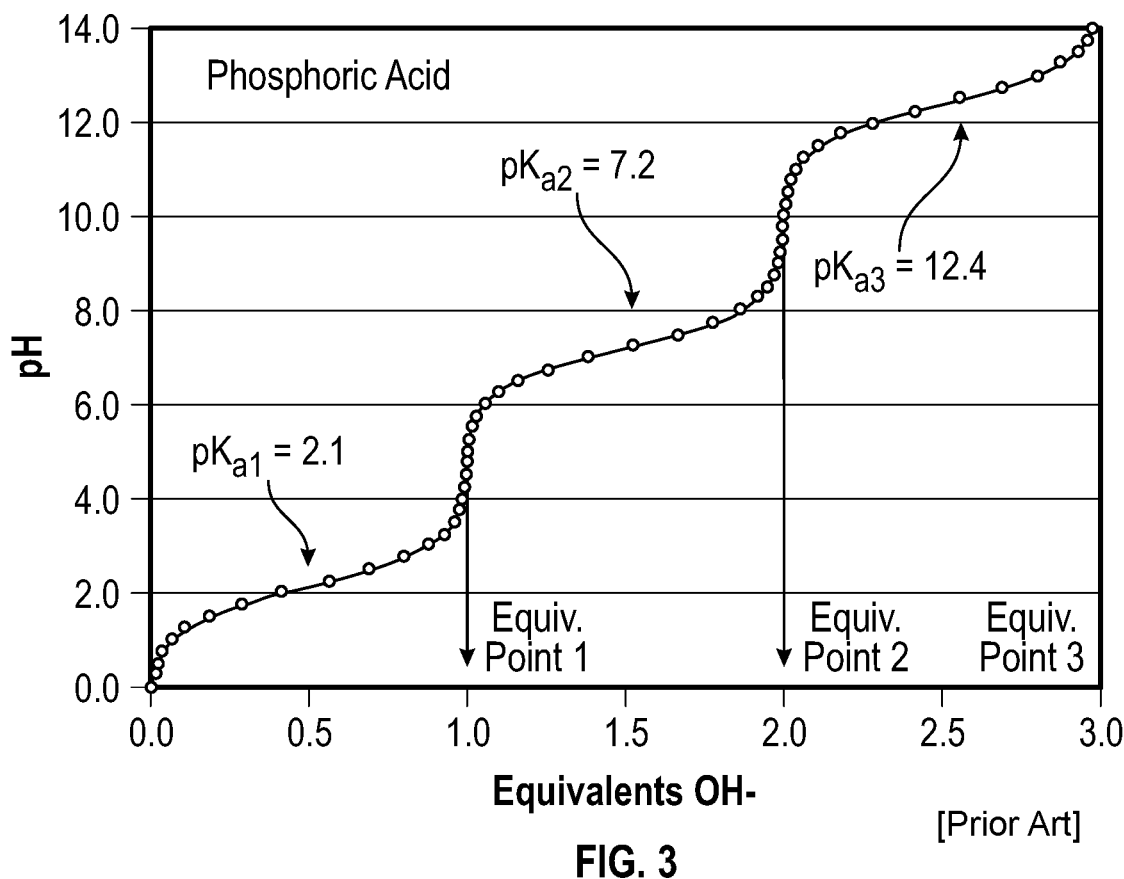
FIG. 3 [Prior Art]
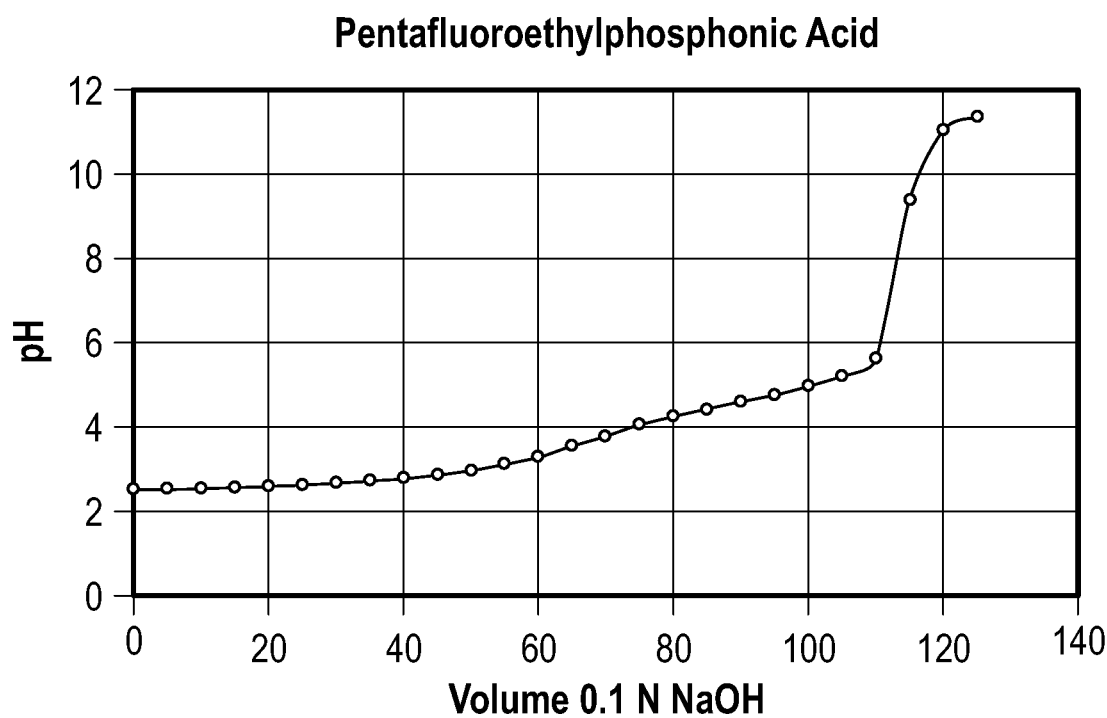
FIG. 4

MATERIALS AMD METHODS FOR BUFFERING ACTIVE CHLORINE SOLUTIONS

RELATED APPLICATIONS

This application is the national stage in the United States of International Patent Application No. PCT/US2018/013997, filed Jan. 17, 2018, which claims priority of U.S. Provisional Application No. 62/445,754, filed Jan. 13, 2017

FIELD OF THE INVENTION

The invention relates to oxidation-resistant buffers, and methods for buffering aqueous solutions containing oxidant species, in particular solutions containing active chlorine, using these oxidation-resistant buffers.

BACKGROUND

The utility of hypochlorite salts as bleaching, disinfecting and sanitizing agents has long been known, and put to common use in such applications as textile bleaching, swimming pool sanitization with calcium hypochlorite, and surface and fabric disinfection with sodium hypochlorite (household bleach.) Alkaline hypochlorite disinfectants are widely used in hospitals, and in the food manufacturing and food service industries. Such compositions are stable to long-term storage, and highly effective, but their extremely high pH renders them corrosive to skin and tissue, and unsuitable for internal or even topical medical applications.

The conjugate acid of hypochlorite, hypochlorous acid, is even more effective as a disinfectant (Nakagawara et al.; *Spectral characterization and the pH Dependence of Bactericidal Activity of the Aqueous Chlorine Solution*. Jap. Soc. Anal. Chem. 1998, 14, 691-698.) For this reason, aqueous hypochlorite solutions, when brought to a sufficiently low pH (4.0-6.0) to provide neutral HOCl as the predominant active chlorine species in solution, are very useful and highly effective topical disinfectants. Potential uses for such solutions in human health include the treatment of periodontal, ocular, and dermal infections, wound irrigation, instrument disinfection and environmental decontamination. Within the food industry, applications include disinfection of food processing equipment and direct washing of fruits and vegetables, fish, poultry, and meat (see e.g. U.S. Patent Publication 2016/0262411.) Despite decades of effort, however, the production of commercially successful products has been an elusive goal. The difficulty lies in the fact that, while the hypochlorite anion is a stable species in an alkaline solution, neutral and acidic solutions have proved to be unstable and difficult to store.

The difficulties and limits on HOCl solution stability and storage have been extensively studied; see for example Robinson, G. et al.; *The Effect of Long-Term Storage on the Physiochemical and Bactericidal Properties of Electrochemically Activated Solutions*. Int. J. Mol. Sci. 2013, 14, 457-469; Len, S. V. et al., *Effects of storage conditions and ph on chlorine loss in electrolyzed oxidizing (EO) water*. J. Agric. Food Chem. 2002, 50, 209-212; Kunigk, L. et al.; *Hypochlorous acid loss from neutral electrolyzed water and sodium hypochlorite solutions upon storage*. Braz. J. Food Technol. 2008, 11, 153-158; Hsu, S.-Y. et al.; *Effects of storage conditions on chemical and physical properties of electrolyzed oxidizing water*. J. Food Engin. 2004, 65, 465-471; and Cui, X. et al.; *Physicochemical properties and bactericidal efficiency of neutral and acidic electrolyzed water under different storage conditions*. J. Food Eng. 2009, 91, 582-586.

The following equilibrium is established at neutral or acidic pH:

$$HOCl + Cl^- + H^+ \leftrightarrows H_2O + Cl_2 \quad \text{(Eqn. 1)}$$

As a consequence of its production method (see below), electrolytic hypochlorous acid necessarily contains a substantial amount of chloride (typically 1% or more w/v), giving rise to an equilibrium amount of elemental chlorine according to Eqn. 1. This presents a problem for the storage of the solution. Chlorine is a volatile gas, and readily escapes into the atmosphere, or into the headspace of containers containing chlorine in solution, from which it rapidly escapes when the container is opened. It is also a small, neutral molecule, and diffuses readily through the low-density polymers commonly used in liquid packaging for consumer products. These factors result in the gradual loss of chlorine from stored solutions of HOCl that contain chloride.

The remarkable utility of HOCl solutions, and the difficulty of storing them, has created a market for machinery capable of generating such solutions in situ. In general, these devices operate by the electrolysis of aqueous sodium chloride, which can be done crudely in a non-membrane cell, but is more usually carried out in a continuous flow membrane cell system. At the anode, chloride is oxidized to yield hypochlorous acid:

$$Cl^- + H_2O \rightarrow HOCl + H^+ + 2e^- \quad \text{(Eqn. 2)}$$

See, e.g., U.S. Pat. Nos. 5,858,201, 6,793,846 and 7,749,370. All such prior art HOCl solutions will be referred to herein as FAC (Free Available Chlorine) solutions or FAC water. FAC solutions typically have a pH between 5 and 7, depending on the feed solution, electrode materials and any blending with alkali or cathode water. FAC solutions may contain oxidative species in addition to HOCl (e.g., ozone, dissolved oxygen and hydrogen peroxide), which purportedly enhance their antimicrobial properties.

Although standard FAC solutions are effective disinfectants, they generally have a limited shelf life (a few hours to a few weeks) due to the reactivity of the HOCl itself, the presence of chloride ions, which displace Equation 1 to the right, and the volatility and reactivity of the elemental chlorine thus produced, the loss of which continues to drive Equation 1 to the right. In closed containers, the loss of chlorine can be slowed, but not halted, unless the container is made of a chlorine-impermeable material such as glass or a high-density fluoropolymer (PCT Pub. No. WO 2015/061632.) Upon the opening of such containers by the consumer, however, chlorine quickly escapes (see U.S. Pat. No. 7,393,522.) Even in a sealed glass container, unbuffered solutions at pH<3 lose their active chlorine after about 2 months' time (see U.S. Pat. No. 7,393,522), presumably due to formation of chlorate.

Products described as "stabilized" HOCl, such as the MICROCYN™ and DERMACYN™ solutions marketed by Sonoma Pharmaceuticals (Landa-Solis, C. et al., *J. Hosp. Infect.* 2005, 291-299), STERILOX™ solutions marketed by PuriCore Plc., and NEUTROPHASE™ solution marketed by Principle Business Enterprises, have been introduced into the market. The stabilization of these products appears to be a function of reduced chloride concentrations, on the order of 0.5-1.0%, and/or a relatively high pH (6.0-7.0), so that the reaction of Equation 1 proceeds at a slower rate, and so that the equilibrium lies less far to the right. However, even these low concentrations of chloride still greatly exceed the concentration of hypochlorous acid (generally 50-1,000 ppm, i.e. 0.005-0.1%), so that chlorine is still generated according to Equation 1, and then lost over the course of time. Compositions in the pH range 6.0-7.0 are more stable, but only a small fraction of the hypochlorite in the form of the desired HOCl, and the antimicrobial activity is greatly reduced relative to the same composition at a pH below 6.

Another problem, as noted above, is that in the absence of a buffer, the pH of a solution of HOCl is observed to decrease over time, slowly at first but at an accelerating rate. This is presumably the consequence of chemical reactions which, while not well-understood, have the net result shown in Equation 3:

$$3HOCl \rightarrow HClO_3 + 2HCl \qquad \text{(Eqn. 3)}$$

The rate of this reaction increases with increasing acidity, therefore the process is self-catalytic and the rate of decomposition (and the rate of pH drop) increases rapidly if the pH is not regulated by a buffer. The effect is shown in FIG. 2, which is copied from prior art U.S. Pat. No. 6,426,066.

There remains a need for topical disinfectants that have the performance advantages of HOCl, without the shortcomings of the electrolytic FAC solutions of the prior art. In particular, there remains a need for more stable HOCl compositions. Although buffering within the pH range 3-7, and particularly in the range 4-6, is expected to stabilize HOCl compositions, there is a need for buffers effective in this range that are stable to active chlorine species.

BRIEF DESCRIPTION OF THE INVENTION

In one aspect of the invention, the invention provides novel phosphonic acids having various pKa values, effective for buffering aqueous solutions at the corresponding pH values. The phosphonic acids of the invention are stable to oxidants such as hydroperoxides, peroxides, percarbonates, perborates, halogens, and a variety of halogen oxyanions and oxyacids.

In another aspect of the invention, the invention provides methods of buffering an aqueous solution containing one the above-described oxidants, by adding to the solution one or more phosphonic acids and adjusting the pH to the desired value. This can be accomplished using one of the novel phosphonic acids of the invention, or using a known phosphonic acid of appropriate structure, as described herein.

The invention provides disinfecting compositions comprising water, hypochlorous acid, and one or more phosphonic acid buffers which maintain the compositions at a pH in the range 3 to 7, and preferably between 4 and 6.

The invention also provides disposable wiping articles and bandages impregnated with these compositions. The wiping articles are suitable for cleaning and disinfecting environmental surfaces in homes, hospitals, farms and businesses, and may incorporate surfactants.

The invention provides methods for disinfecting the skin, cleaning and treating wounds and burns, and treating ocular infections in human and veterinary medicine. The invention also provides methods for cleaning and disinfecting environmental surfaces with the compositions and wipes of the invention.

BRIEF DESCRIPTION OF THE FIGURES

FIG. 1 shows the variation in relative molar concentrations of the species HOCl, OCl⁻, and Cl₂ as a function of pH.

FIG. 2 shows the drop in pH over time, for prior art unbuffered solutions of HOCl.

FIG. 3 shows the titration curve of phosphoric acid.

FIG. 4 shows the titration curve of pentafluoroethylphosphonic acid.

DETAILED DESCRIPTION OF THE INVENTION

Figure 5:
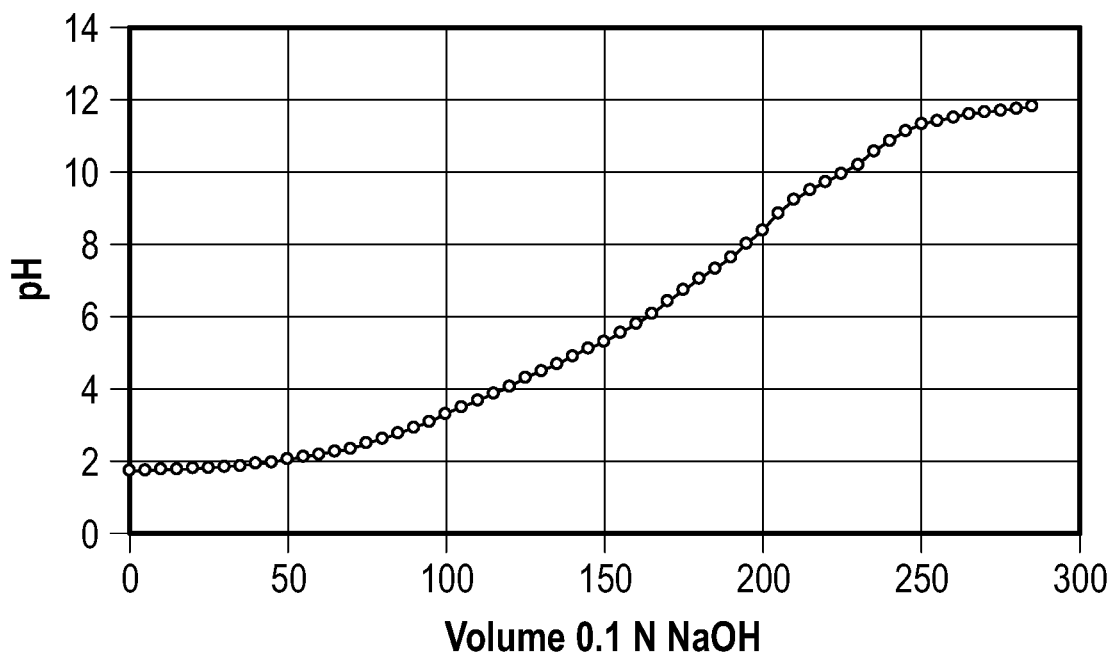
FIG. 5 shows the titration curve of pyridine-2,6-diphosphonic acid.

For purposes of this disclosure, pH values are provided to one or two significant figures (e.g., "pH 3" or "pH 3.0"). It should be understood that in the context of this disclosure, unless presented in reference to charts, graphs, calculations, or experimental data, such numbers are approximations, not absolute limits, and are intended to serve as guides to the nature of the invention. Solutions in practice may vary within 0.5 pH units from the stated values without departing from the intended scope of the invention. Claims reciting pH values are to be construed accordingly, and with all due regard for the doctrine of equivalents.

Aqueous solutions containing chlorine and/or hypochlorous acid are referred to herein as free active chlorine or "FAC" solutions, regardless of their method of preparation and without regard to other species that may be present. Concentrations of HOCl are reported herein as ppm active chlorine, as determined by colorimetry using N,N-diethyl-p-phenylenediamine (DPD) as indicator. Samples were diluted 999:1 with distilled water prior to addition of a DPD-1 tablet (Pollardwater, New Hyde Park, N.Y.) to a 10-ml sample, and the value for ppm chlorine was determined with a colorimeter (MW-10, Milwaukee Instruments, Rocky Mount, N.C.) Chloride concentrations were determined by agentometric (Mohr) titration. Titration curves were determined by dissolving 40 mg of buffer in 20 ml distilled water and adding standardized 0.1 N NaOH or HCl, with pH measured with a digital pH meter calibrated daily at pH 4.0. New and known buffers were synthesized by the cited literature methods, varying the starting materials as required.

The invention provides a method of buffering a free active chlorine (FAC) solution to a pH in the range of 3 to 7, which comprises combining the FAC solution with an effective buffering amount of a phosphonic acid of formula I

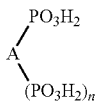

I or a soluble salt thereof, and adjusting the pH of the resulting solution to a pH between 3 and 7. In formula I, A is an aromatic or heteroaromatic ring, or a $C_1$-$C_{10}$ alkyl group. When A is an aromatic ring, n is 0-5; when A is a $C_5N$ heteroaromatic ring, n is 0-4, when A is a $C_4N_2$ heteroaromatic ring or $C_1$-$C_{10}$ alkyl, n is 0-3; and when A is a $C_3N_3$ heteroaromatic ring, n is 0-2.

The phosphonic acid I may have formula II or formula III

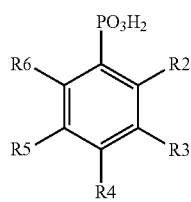

II

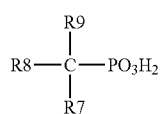

III where R2 through R6 are each independently H, F, Cl, Br, $CF_3$, $SO_3H$, $CF_2PO_3H_2$, or $PO_3H_2$, and R7 through R9 are each independently F, Cl, $C_1$-$C_9$ alkyl, perfluoro-$C_1$-$C_9$ alkyl, aryl, $PO_3H_2$ $PO_3H_2$, $CF_2PO_3H_2$, $CF_2$ $CF_2PO_3H_2$, $CCl_2PO_3H_2$, $CFCF_3PO_3H_2$, or $CFClPO_3H_2$.

The invention also provides a buffered aqueous solution of hypochlorous acid, having a concentration of hypochlorous acid between 50 ppm and 1000 ppm and having a pH buffered in the range of 3 to 7, which contains an effective buffering amount of a soluble salt of one or more phosphonic acids of formula II or III In preferred embodiments, the buffered aqueous solution of hypochlorous acid contains less than 200 ppm chloride, and more preferably less than 100 ppm chloride.

The invention also provides disposable wiping articles impregnated with a buffered aqueous solution of hypochlorous acid, having a concentration of hypochlorous acid between 50 ppm and 1000 ppm and having a pH buffered in the range of 3 to 7, which contains an effective buffering amount of a soluble salt of one or more phosphonic acids of formula II or III In preferred embodiments, the buffered aqueous solution of hypochlorous acid contains less than 200 ppm chloride, and more preferably less than 100 ppm chloride.

The invention further provides novel phosphonic acids having formula IV

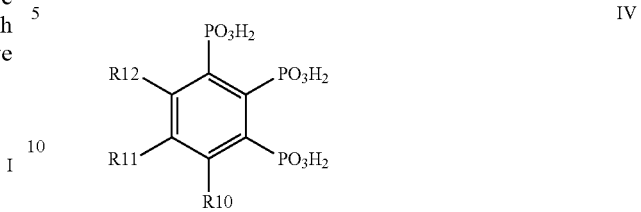

IV where R10 through R12 are each independently selected from the group consisting of H, F, Cl, Br, $CF_3$, $SO_3H$, $CF_2PO_3H_2$, and $PO_3H_2$.

(A) Buffers and Buffered Solutions

It is desirable to stabilize the pH of a solution of HOCl with a buffer capable of maintaining the pH at least within the range 3-7, and preferably capable of maintaining a pH in the range 4-6. Most known buffers having pKa value between 3 and 7 contain an amino group, which is subject to N-oxidation or N-chlorination, and/or a carboxylic acid group, which is subject to formation of acyl peroxide or acyl hypochlorite species. It has therefore been difficult to find appropriate buffers, and the present invention is the first to provide a solution to the problem for hypochlorous acid solutions.

A purported solution to the problem is disclosed in US patent application publication No. 2012/0269904, in which a phosphate buffer is claimed to be suitable as a buffer for hypochlorous acid solutions. However, as can be seen from FIG. 1, in order for a hypochlorite solution to exist primarily as the molecular species HOCl, the solution must be maintained within the pH range 3-6, and it is clear from FIG. 3 that phosphate has no buffering capacity in this range. Phosphate has buffering capacity in the pH range 2-3, where oxidation of chloride to $Cl_2$ and decomposition to chlorate both take place, and at pH 7-8, where HOCl is entirely dissociated into the hypochlorite anion.

Acetate and other carboxylates have also been suggested as suitable buffers, but alkyl and aryl carboxylates react with FAC solutions to produce the corresponding acyl hypochlorites, which are subject to radical dissociation and decarboxylation. The carbonic acid/bicarbonate buffer system is stable to FAC, but the temperature and pressure dependence of $CO_2$ solubility render carbonic acid impractical.

The present inventors have discovered that certain mono- and polyphosphonic acid salts are stable to FAC solutions, and have the ability to provide buffering in the pH range 3-7, and in preferred embodiments, buffering in the more desirable range of 4-6. For clarity and convenience, the buffer species are represented and discussed as their conjugate acids, but it will be understood that the species in solution within the target pH ranges are anions, and often polyanions.

Certain of the buffer species exhibit a sensitivity of pKa values, and hence a sensitivity of the buffering pH range, to the presence of metal ions. Divalent metal ions, such as $Mg^{++}$, $Ca^{++}$, $Sr^{++}$ and $Zn^{++}$, are particularly effective. Significant shifts can also be obtained by adding boron (borate) and aluminum(III) salts. Accordingly, the invention provides adjustable or "tunable" buffers, which feature a degree of control over the effective buffering range.

The invention provides a method of buffering a FAC solution to a pH in the range of 3-7, which comprises combining a FAC solution with an effective buffering amount of a phosphonic acid of general formula I. In formula I, A is an aromatic or heteroaromatic ring, such as a naphthylene, benzene, pyridine, or pyrazine ring, in which n may range from 0 to 6, or else A is a $C_1$-$C_{10}$ alkyl group, in which case n may range from 0 to 4. Where A is alkyl, it is preferably halogenated at all positions alpha to the phosphonate group(s). Where A is pyridine or pyrazine, a ring nitrogen is preferably in the form of an N-oxide or N-methyl pyridinium (or pyrazinium) salt.

The method of the invention comprises adding an effective buffering amount of a phosphonic acid of formula I, or an alkali metal or alkaline earth salt thereof, to the solution to be buffered, and adjusting the pH of the resulting solution to the desired pH. By way of example, after adding a buffer of appropriate pKa, a solution of hypochlorous acid may be adjusted to a pH between 3 and 7.

In formula II, R2 through R6 are each independently H, F, Cl, Br, $CF_3$, $SO_3H$, $CF_2PO_3H_2$, and $PO_3H_2$. Preferably, the compound II acid is at least tribasic, i.e., at least one of R2 through R6 is $PO_3H_2$ or $SO_3H$. More preferably, R2 and/or R6 is $PO_3H_2$. Among the halogens, Cl and F are preferred.

An "effective buffering amount" is any amount that regulates the pH to the desired range. The amount is physically limited only by the solubility of the buffering species, but is limited in practice by the amount of residue deemed to be acceptable upon evaporation of the buffered solution. The lower limit is a function of the molar amount of acid that is expected to be generated by the reaction of Equation 3 above, over the desired shelf life of the solution. In preferred embodiments, the effective buffering amount, measured in molar concentration, ranges from 1% to 100% of the molar concentration of the active chlorine species present in the solution. In more preferred embodiments, the amount is between 10% and 50% of the molar concentration of active chlorine species.

Specifically contemplated examples of formula II, and references to representative syntheses, include the following: 1,2-benzenediphosphonic acid (P. Tavs, *Chem. Ber.* 1970, 103:2428); 1,3-benzenediphosphonic acid (ibid.); 4-sulfophenylphosphonic acid (E. Montoneri et al., *Chem. Mater.* 2007, 19:2671); 3-sulfophenylphosphonic acid (Z.-Y. Du et al., *Inorg. Chem.* 2006, 45:6424); 5-fluoro-1,3-benzenediphosphonic acid, 5-chloro-1,3-benzenediphosphonic acid (S. N. Tverdomed, *Russ. J. Gen. Chem.* (*Engl. Trans*) 2001, 71:1821); 5-bromo-1,3-benzenediphosphonic acid, 1,4-benzenediphosphonic acid (J. F. Bunnett et al., *J. Org. Chem.* 1978, 43:1867); 1-phosphonobenzene-3,5-disulfonic acid (E. Montoneri et al., *Phosphorus, Sulphur Silicon Relat. Elem.* 1994, 86:145); 1,3,5-benzenetriphosphonic acid (S. R. Kim et al. *J. Am Chem. Soc.* 2013, 135:963; S. A. Reiter et al., *Helv. Chim. Acta*, 2002, 85: 1140); 2-chloro-1,3,5-benzenetriphosphonic acid; 1,2,3-benzenetriphosphonic acid; 4-chloro-1,2,3-benzenetriphosphonic acid; 5-chloro-1,2,3-benzenetriphosphonic acid; 1,2,4-benzenetriphosphonic acid; 3-chloro-1,2,4-benzenetriphosphonic acid; 5-chloro-1,2,4-benzenetriphosphonic acid; 6-chloro-1,2,4-benzenetriphosphonic acid; 1,2,3,4-benzenetetraphosphonic acid; 1,2,3,5-benzenetetraphosphonic acid; 4-chloro-1,2,3,5-benzenetetraphosphonic acid; 1,2,4,5-benzenetetraphosphonic acid; 3-chloro-1,2,4,5-benzenetetraphosphonic acid; 3,6-difluoro-1,2,4,5-benzenetetraphosphonic acid; 3,6-dichloro-1,2,4,5-benzenetetraphosphonic acid; 1,2,3,4,5,6-benzenehexaphosphonic acid; 1,8-naphthalenediphosphonic acid; pyridine-2-phosphonic acid, N-methylpyridinium-2-phosphonic acid, pyridine-2-phosphonic acid N-oxide (D. J. McCabe et al., *Inorg. Chem.* 1987, 26:1230), pyridine-2,6-diphosphonic acid, N-methylpyridinium-2,6-diphosphonic acid, pyridine-2,6-diphosphonic acid N-oxide, pyrazine 2,5-diphosphonic acid, and pyrazine 2,6-diphosphonic acid. Various fluorinated and brominated analogues of the above species will be apparent to those of skill in the art, and are within the scope of the invention.

The above-identified buffer molecules, by virtue of their plurality of ionizable acid groups, have a wide buffering range, and many have at least one pKa (and therefore buffering capacity) in the range of pH 3 to pH 7. Phenyphosphonic acid has a second pKa of just over 7, and is usable at that pH (O. Mäkitie, V. Konttinen, *Acta Chem. Scand.* 1969, 23:1459-1461), but preferably at least one of R2 through R6 are also $PO_3H_2$. The sulfonic and phosphonic acid groups are unreactive toward FAC solutions, and the aromatic rings are resistant to electrophilic chlorination by virtue of the electron-withdrawing nature of the sulfonate and phosphate groups. The halogen substituents F, Cl and Br can confer added stability, and can be selected to fine-tune the pKa of the species.

The above species are either known in the art, or readily available by synthesis from the corresponding polyhalogenated aromatic and heteroaromatic species, in the same manner as used to prepare the known materials. Representative preparations of polysulfonic acids are described by A. Mietrach et al., *Eur. J. Inorg. Chem.* 2009, 5328; see P. Cogolli et al., *J. Org. Chem.* 1979, 44:2642 for preparation of precursor polythiols. Polyphosphonic acids are prepared by hydrolysis of the corresponding trimethylsilyl or alkyl esters, which are derived from reaction of aryl halides with phosphite esters in the presence of iron, nickel, or palladium catalysts, or via photolysis. (P. Tavs, *Chem. Ber.* 1970, 103:2428; N. Demik et al., *Russ. Chem. Bull.* 1991 40:1300; E. Jablonkai, G. Keglevich, *Org. Prep. Proc. Intl.* 2014, 46, 281.) Halogen substituents may be introduced via nitration, reduction, and diazotization, followed by halide substitution (Sandmeyer reaction.) Alkyl phosphonate esters are generally hydrolyzed with aqueous acid or alkali, or by treatment with HBr in acetic acid. The free acid, or a suitable salt thereof, may be purified by recrystallization using methods routine in the chemical arts.

In certain embodiments, the phosphonic acid is of general formula III:

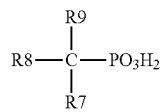

III

In formula III, R7 through R9 are each independently F, Cl, $C_1$-$C_9$ alkyl, perfluoro-$C_1$-$C_9$ alkyl, aryl, $PO_3H_2$, $CF_2PO_3H_2$, $CF_2$ $CF_2PO_3H_2$, $CCl_2PO_3H_2$, $CFCF_3PO_3H_2$, or $CFClPO_3H_2$, and aryl groups, if present, may optionally be substituted with one or more halogens. Specifically contemplated examples, and references to representative syntheses, include the following: trichloromethanephosphonic acid (U.S. Pat. No. 2,785,197), trifluoromethanephosphonic acid (commercially available), dichloromethanediphosphonic acid (clodronic acid, commercially available), difluoromethanediphosphonic acid (C. E. McKenna, P.-D. Shen. *J. Org. Chem.* 1981, 46:4573), chlorofluoromethanephosphonic acid (C. E. McKenna et al., *Phosphorous Sulfur Relat.*

Elements 1988, 37:1), chloromethanetriphosphonic acid (U.S. Pat. No. 3,471,552), fluoromethanetriphosphonic acid, methane tetraphosphonic acid (U.S. Pat. No. 3,471,552), phenyldifluoromethanephosphonic acid, pentafluoroethylphosphonic acid (commercially available), and nonafluorobutane-1-phosphonic acid.

The general procedure for preparing a buffered FAC solution i is illustrated by the following representative example: To 1,2-benzenediphosphonic acid (1.0 g) in water (50 ml), optionally containing 1-2 equivalents of a divalent metal ion, is added 10% aqueous NaOH, dropwise with stirring, until a solution with pH 3.0 to pH 4.0 is obtained. This solution is added to 1,000 ml of a solution of HOCl (ca. 500 ppm), and the pH is adjusted to 4.0 by dropwise addition of 10% aqueous NaOH. If adjustment to a lower pH is desired, it is preferable to use nitric, phosphoric, or sulfuric acid, and avoid the use of hydrochloric acid, which introduces undesired chloride to the solution.

In the same manner, any of the buffer species of the invention can be selected, combined with a solution in need of buffering, and the pH adjusted to within the buffering range of the species selected. A phosphonate buffer species of the invention, when added at a concentration of 10 mM to a 500 ppm HOCl solution, did not reduce the active chlorine concentration over a period of several months. The buffers are expected to be similarly unreactive toward peroxides and hydroperoxides.

FIG. 4 shows the titration curve of pentafluoroethylphosphonic acid. The first pKa leads to buffering at pH 2.5-3.5, and the second pKa provides buffering at pH 4-5. This material is expected to be entirely stable to oxidizing and chlorinating species.

Figure 6:
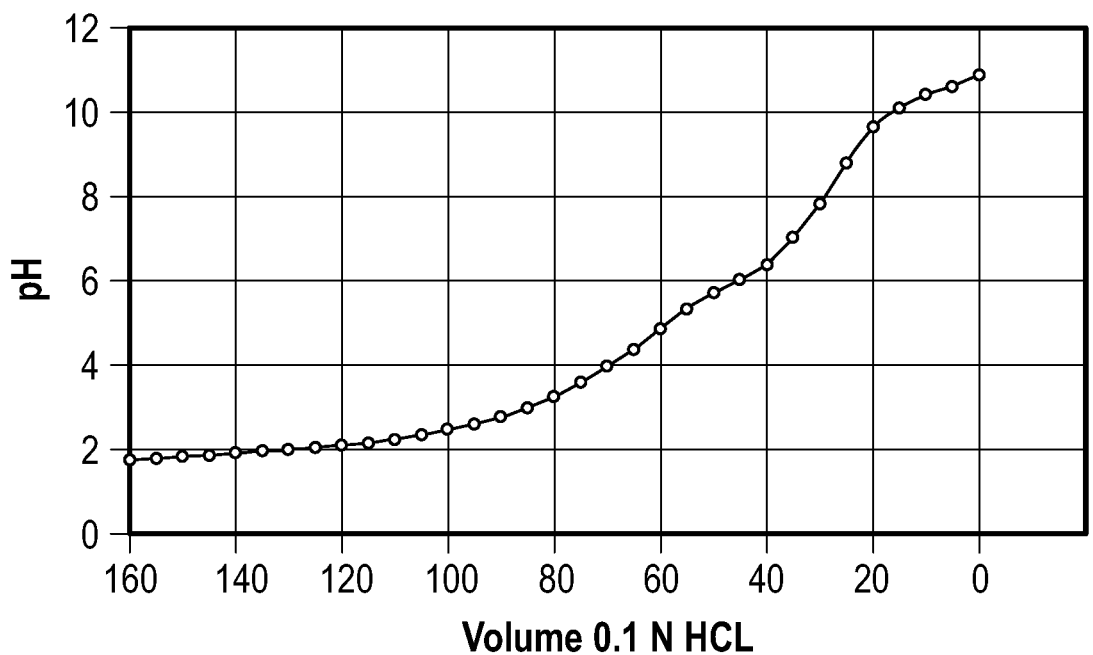
FIG. 6 shows the titration curve of pyridine-2,6-diphosphonic acid in the presence of magnesium ions.

FIG. 5 shows the titration curve of pyridine-2,6-diphosphonic acid, titrated with NaOH. It appears that the four pKa values are evenly spaced, leading to an almost straight line as the pH rises from 2 to 11. The species thus provides only modest buffering, but does so at almost any desired pH. Magnesium sulfate was added at the end of the titration, and titration back to pH 2 was carried out with HCl. FIG. 6 shows the resulting titration curve. Pyridine-2,6-diphosphonic acid in the presence of magnesium exhibits a slightly more structured titration curve, but substantial buffering is seen only in the pH range 2-3.

Figure 7:
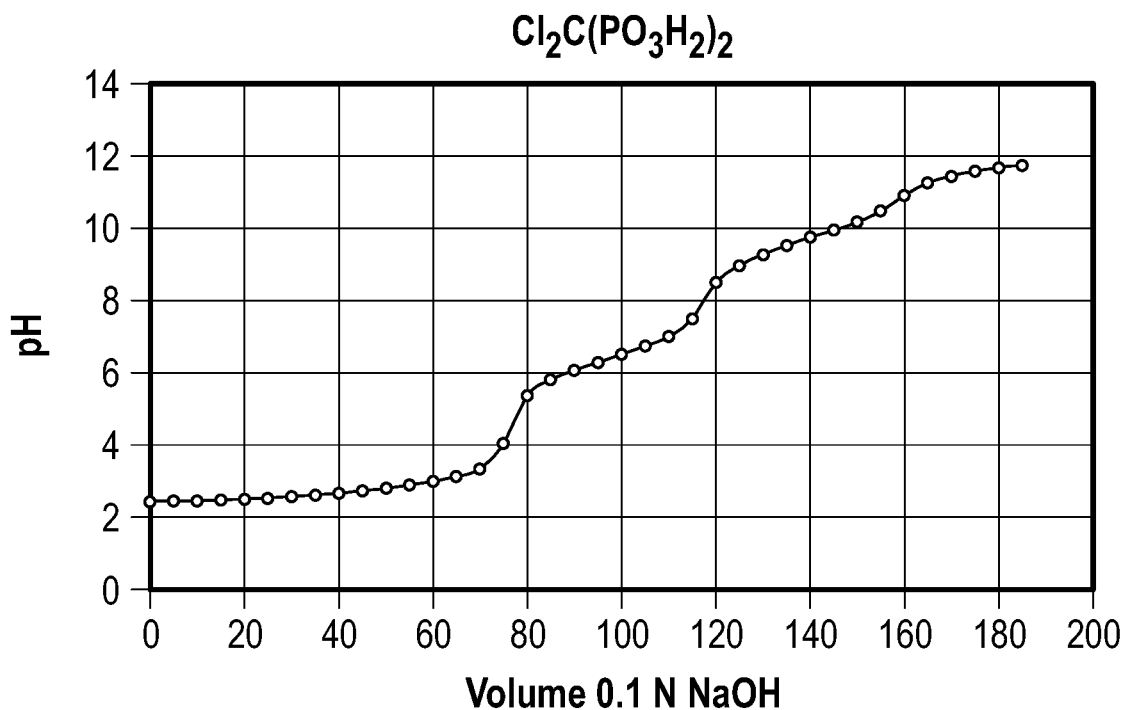
FIG. 7 shows the titration curve of clodronic acid.
Figure 8:
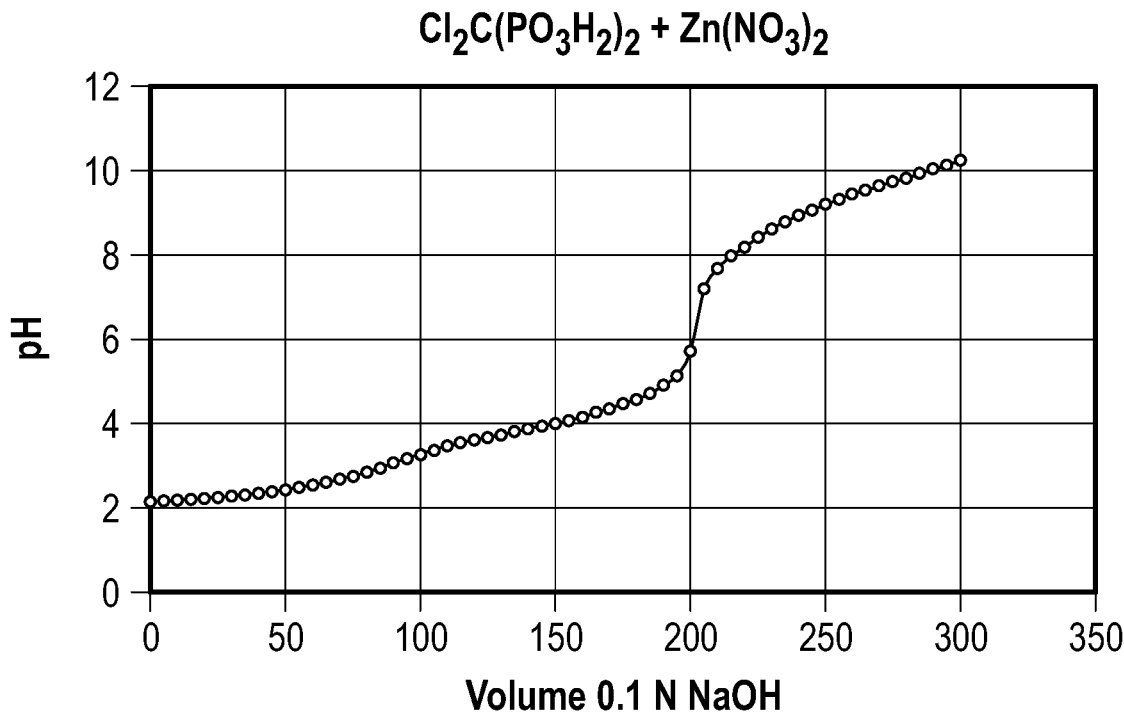
FIG. 8 shows the titration curve of clodronic acid in the presence of zinc ions.
Figure 9:
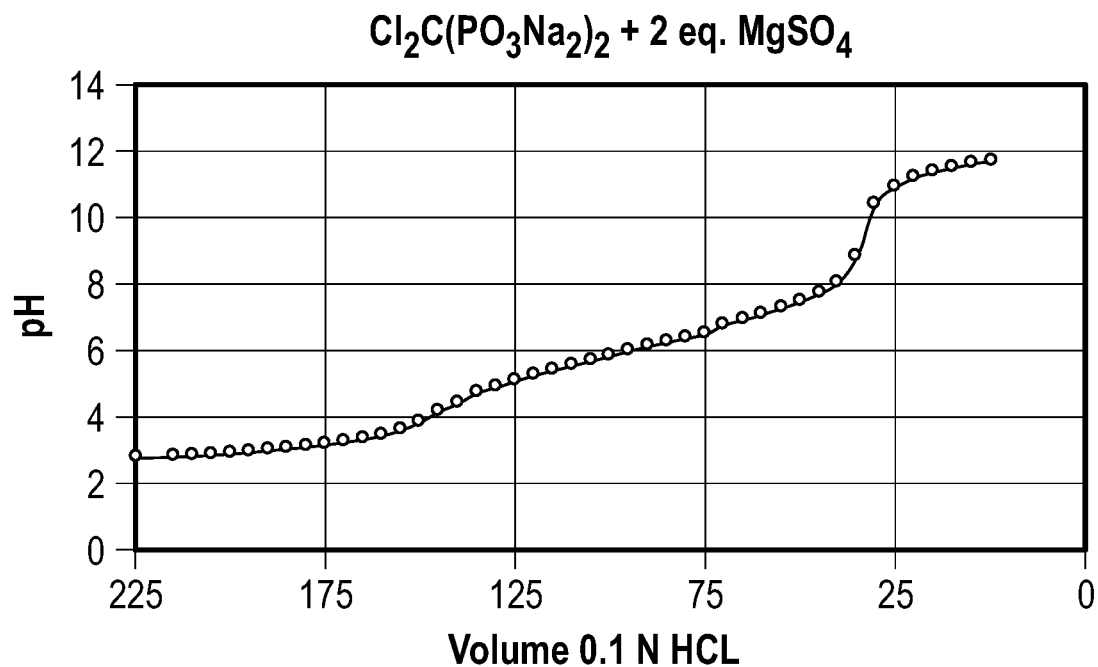
FIG. 9 shows the titration curve of clodronic acid in the presence of magnesium ions.

FIG. 7 shows the titration curve dichloromethanediphosphonic acid, commonly known as clodronic acid. The first two pKas provide buffering at pH 2-3, the third at pH 6-7, and the fourth at pH 9-10. The high pKa of the fourth proton is observed in other germinal and ortho diphosphonates (see below), and the inventors ascribe this to chelation of the proton between adjacent phosphonate moieties, in analogy to the high pKa values of protonated peri-naphthylenediamines, the so-called "proton sponges". Addition of zinc nitrate (2 equivalents) prior to titration results in the curve shown in FIG. 8. Presumably as a result of chelation of zinc by the phosphonate groups, the high pKa of the fourth proton is abolished, and the third and fourth pKa values are both remarkably shifted down to the 3.5-4.5 range. Addition of magnesium rather than zinc produces a similar effect, but the resulting buffering range is 5-8. Clodronic acid, used as a buffer, thus offers remarkable tunability.

Figure 10:
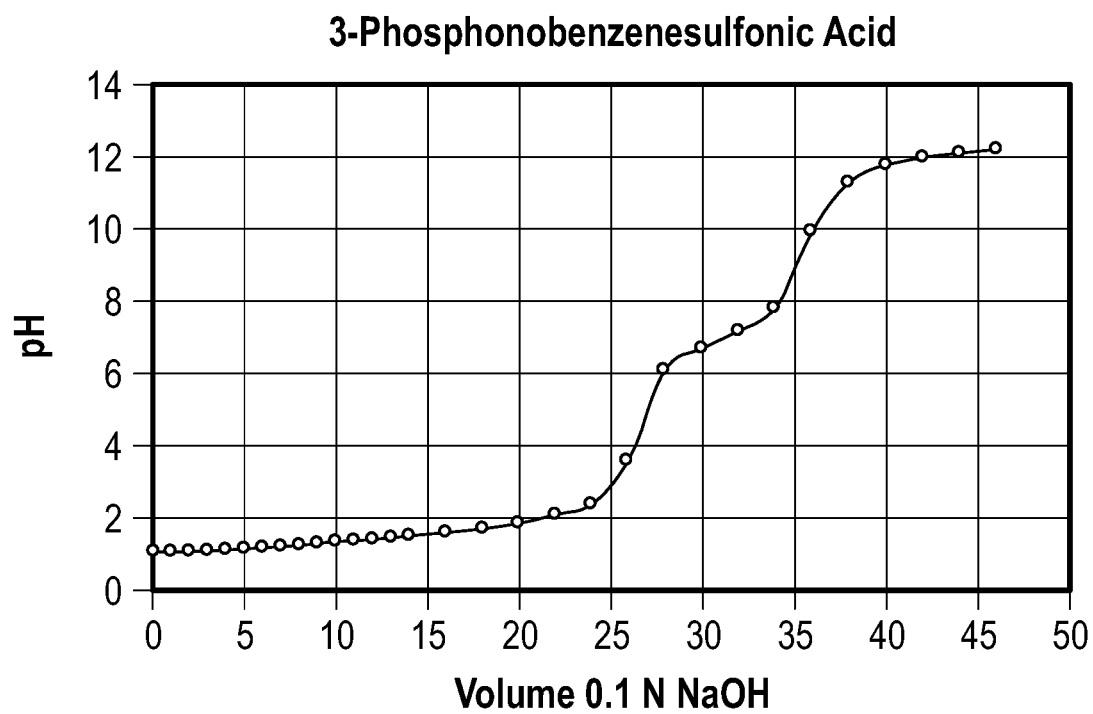
FIG. 10 shows the titration curve of 3-phosphonobenzenesulfonic acid.

FIG. 10 shows the titration curve of 3-phosphonobenzenesulfonic acid. All sulfonic acids examined exhibited pKa values for sulfonate in the range 1-2, regardless of the number of sulfonate moieties. The two phosphonate protons provide buffering at pH 1.5-2 and moderate buffering at 6.5-7.5; these are typical of benzenephosphonic acids and are evidently unaffected by the negative charge on the sulfonate group.

Figure 11:
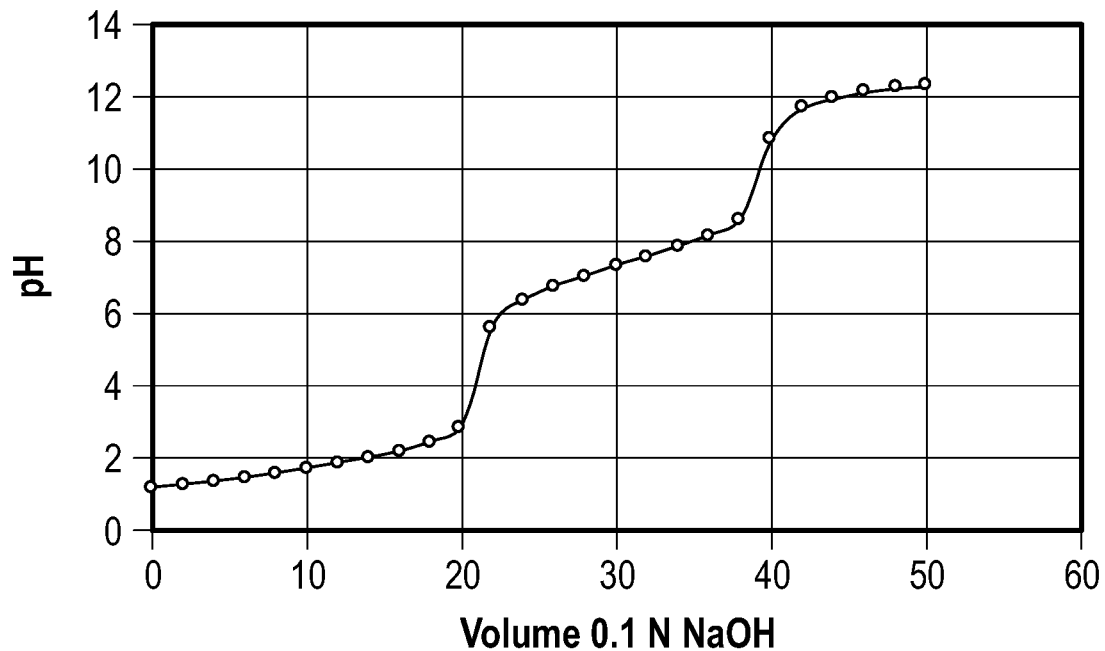
FIG. 11 shows the titration curve of benzene-1,3-diphosphonic acid.

FIG. 11 shows the titration curve of benzene-1,3-diphosphonic acid. Here again, typical benzenephosphonic acid pKa values are observed, with little sensitivity to the considerable negative charge on the molecule.

Figure 12:
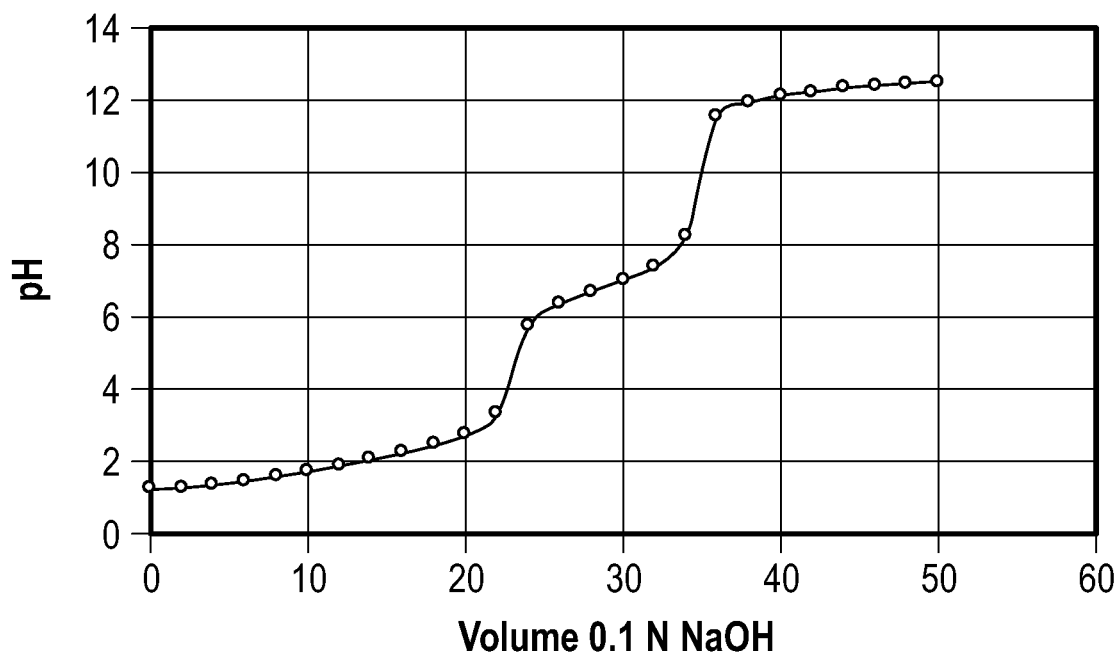
FIG. 12 shows the titration curve of benzene-1,2-diphosphonic acid.

FIG. 12 shows the titration curve of benzene-1,2-diphosphonic acid, which is of interest in that a fourth pKa value cannot be observed. Two protons buffer between pH 1 and 3, but between pH 6 and 8 only a single proton is removed.

Figure 13:
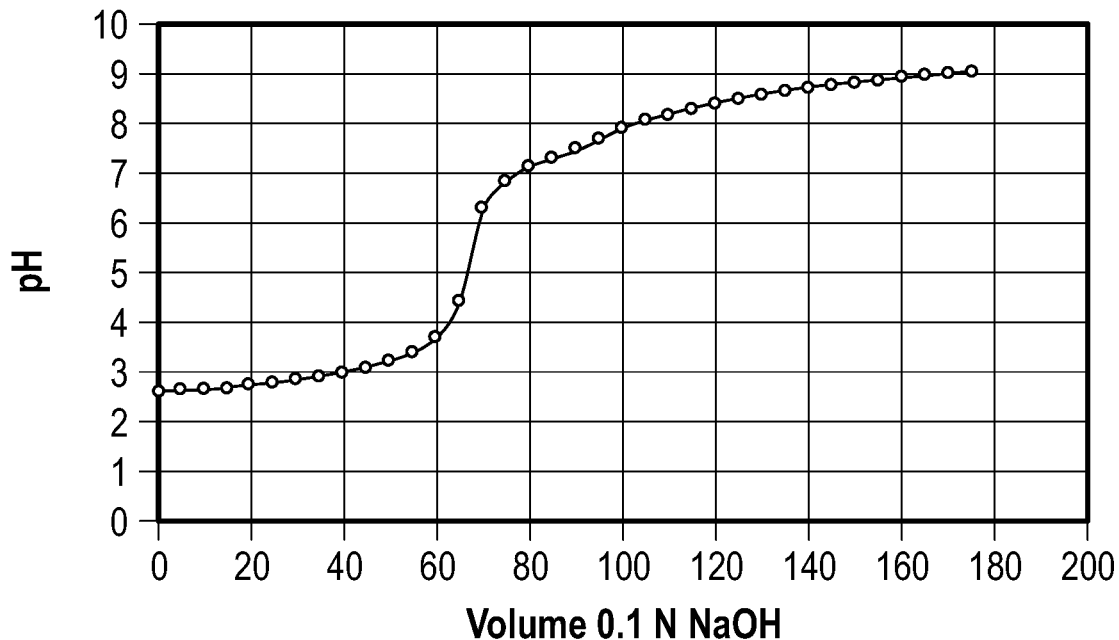
FIG. 13 shows the titration curve of benzene-1,2-diphosphonic acid in the presence of borate ions.

FIG. 13 shows the titration curve of benzene-1,2-diphosphonic acid in the presence of one equivalent of boric acid. A chelated structure is expected, and it appears that the third and fourth pKa values are shifted upward to the 7-9 range. The extended buffering at pH 8-9 is ascribed to overlap with boric acid buffering.

Figure 14:
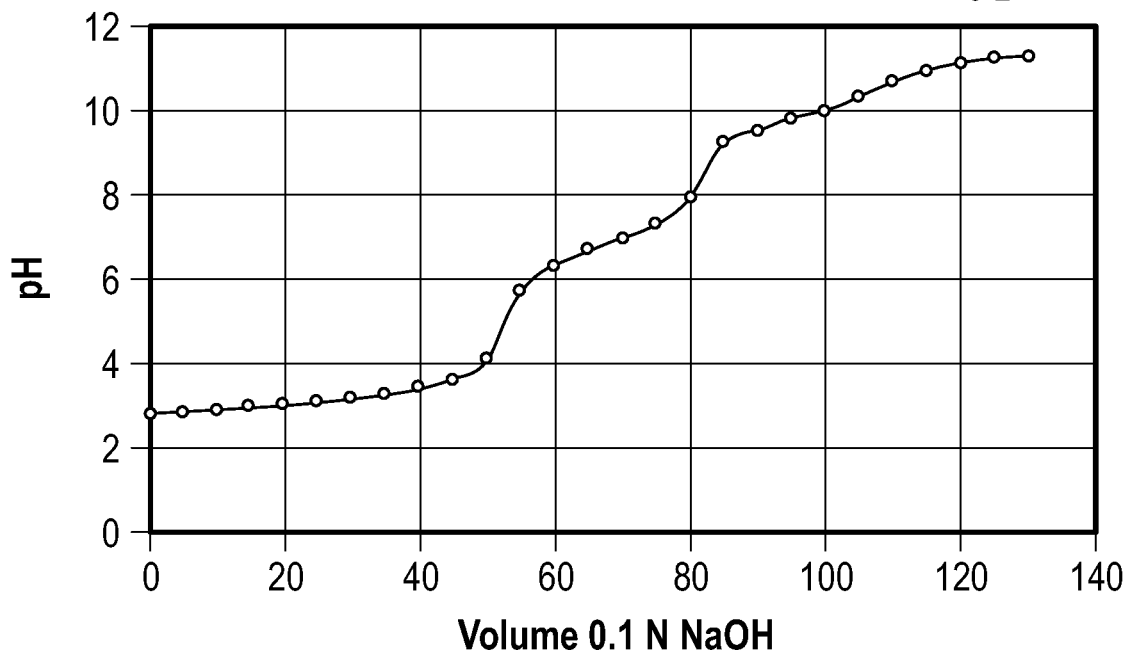
FIG. 14 shows the titration curve of benzene-1,2-diphosphonic acid in the presence of strontium ions.

FIG. 14 shows the titration curve of benzene-1,2-diphosphonic acid in the presence of added strontium nitrate. Comparing to FIG. 12, the first two pKa values appear to be shifted upwards into the range 3-4, while the third pKa value is relatively unchanged. The fourth pKa value, previously unmeasurable, appears to be in the range 9.5-10.5.

Figure 15:
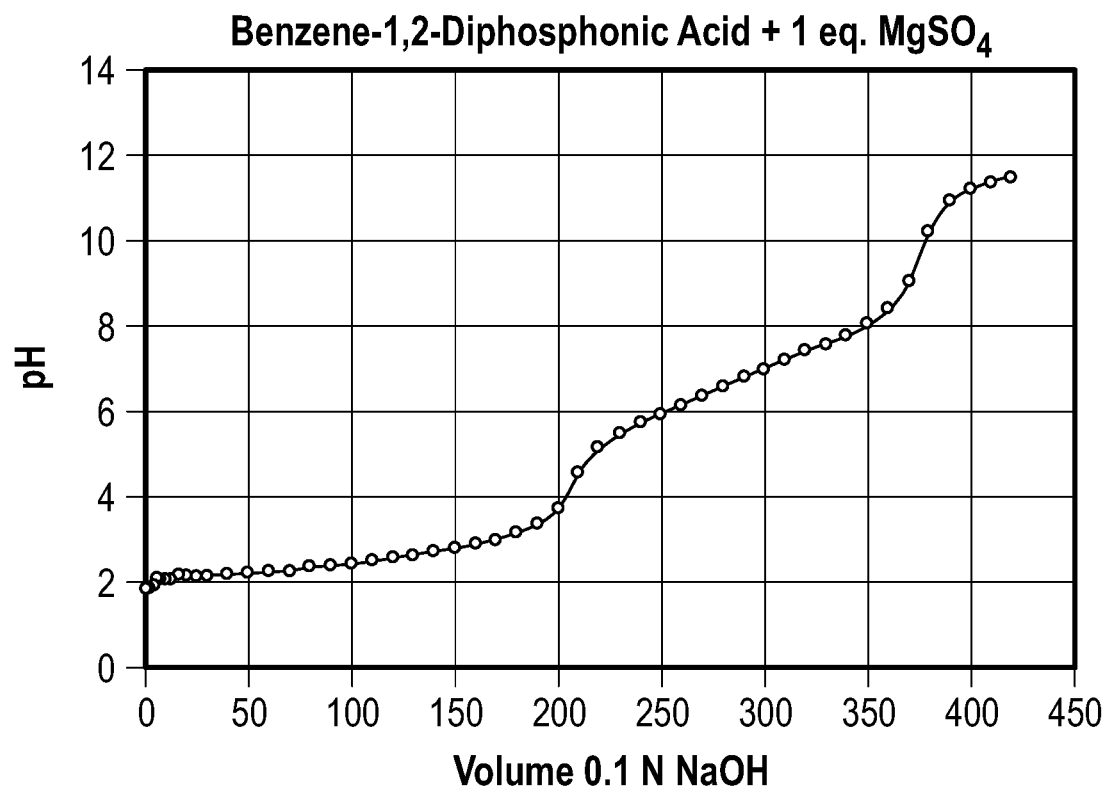
FIG. 15 shows the titration curve of benzene-1,2-diphosphonic acid in the presence of magnesium ions.
Figure 16:
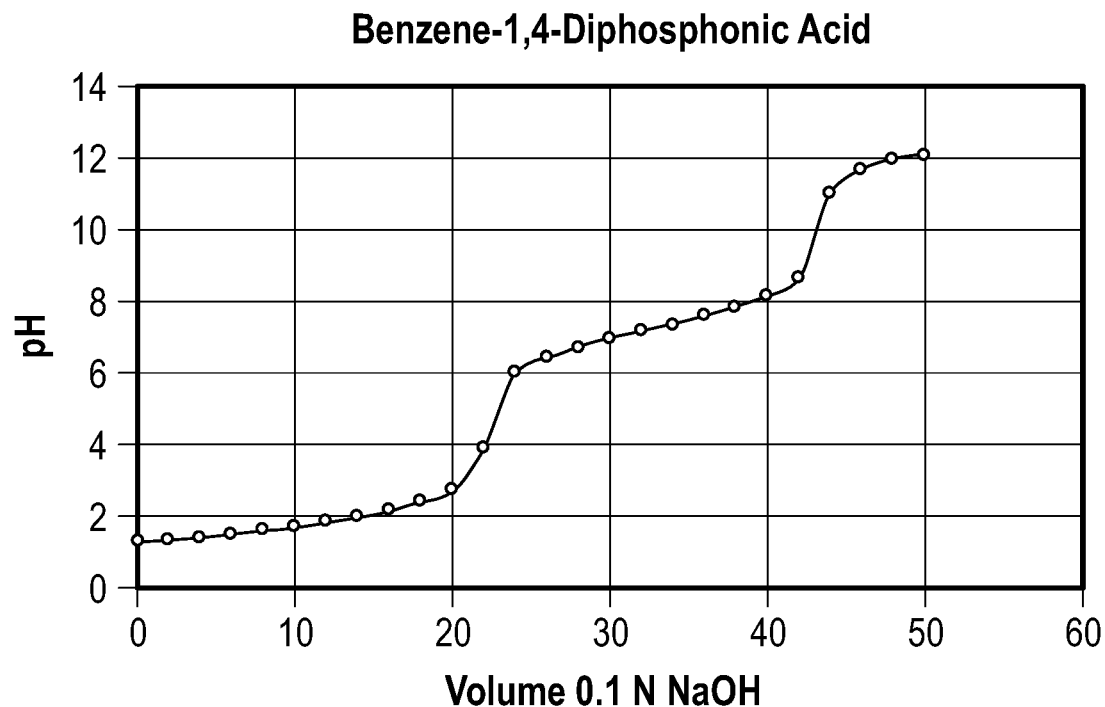
FIG. 16 shows the titration curve of benzene-1,4-diphosphonic acid.

FIG. 15 shows the titration curve of benzene-1,2-diphosphonic acid in the presence of magnesium sulfate. Of interest here is that the fourth pKa is now in the range below 8. Relatively strong chelation of Mg is the most likely explanation. The resulting curve is similar to those of benzene-1,3-diphosphonic acid (FIG. 11) and benzene-1,4-diphosphonic acid (FIG. 16).

Figure 17:
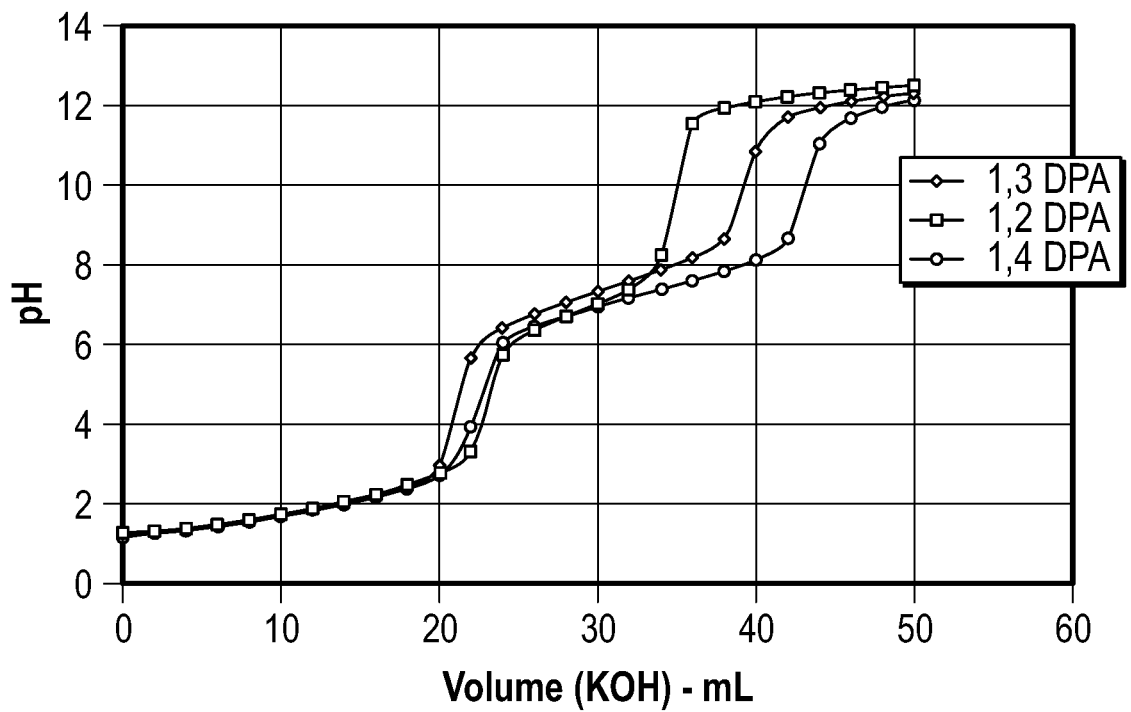
FIG. 17 shows the superimposed titration curves of benzene-1,2-diphosphonic acid, benzene-1,3-diphosphonic acid, and benzene-1,4-diphosphonic acid.

FIG. 17 shows the superimposed titration curves of benzene-1,2-diphosphonic acid, benzene-1,3-diphosphonic acid, and benzene-1,4-diphosphonic acid. The "missing proton" in the titration of the 1,2 isomer is made apparent here.

Figure 18:
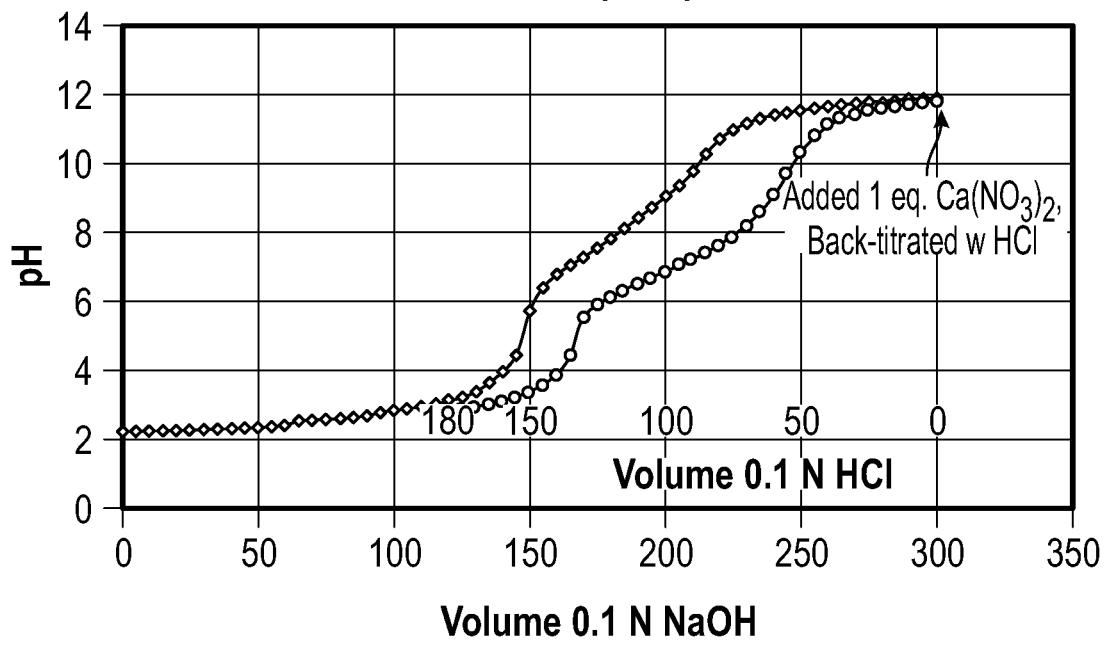
FIG. 18 shows the titration curve of benzene-1,2,3-triphosphonic acid with and without added calcium ions.

FIG. 18 shows the titration curve of benzene-1,2,3-triphosphonic acid with and without added calcium nitrate. At the end of the titration with NaOH, calcium nitrate was added, and the solution titrated back to pH 3 with HCl. Despite the presence of two "chelatable" protons, there is only one "missing proton" evident in the forward titration, where three protons are titrated at pH 2-4, and only two are titrated at pH 7-11. The missing proton is present ant titratable after the addition of calcium, in the same manner that magnesium affected the 1,2-diphosphonic acid (FIG. 15.)

Figure 19:
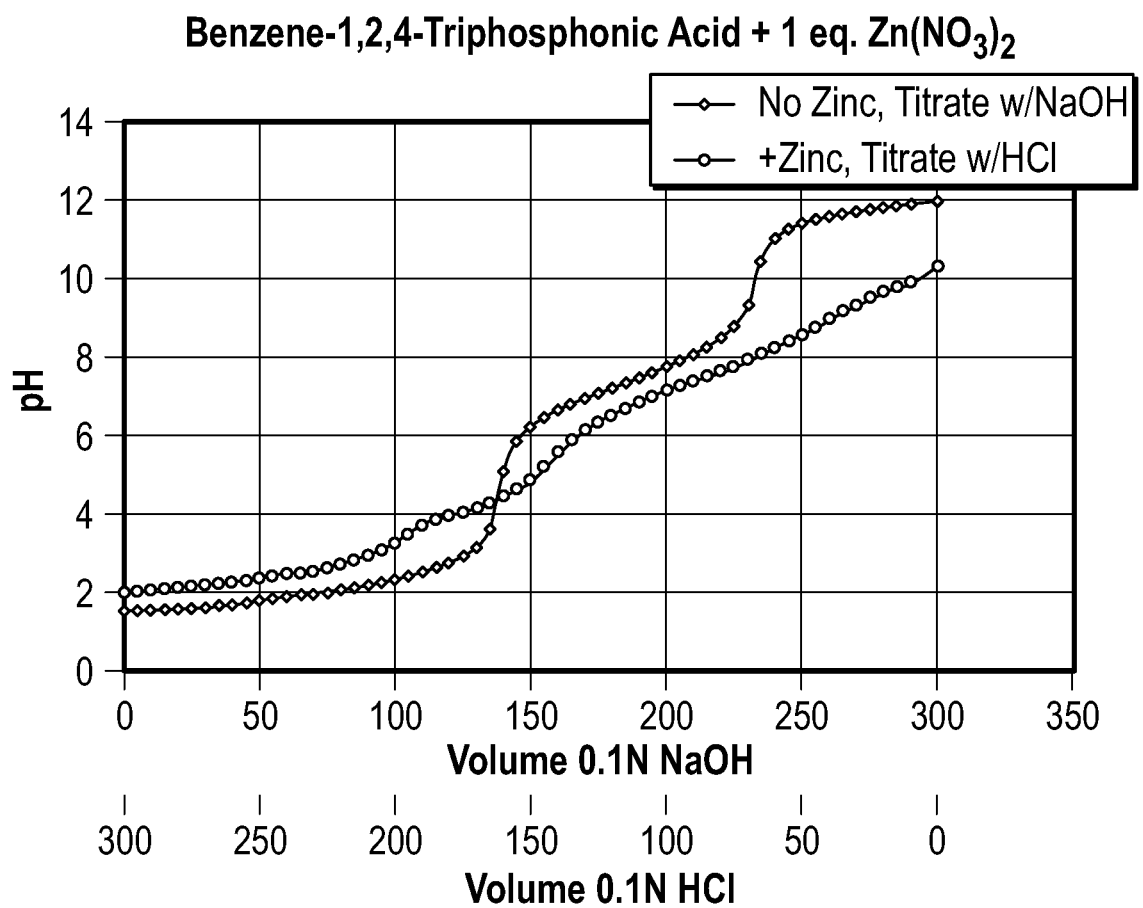
FIG. 19 shows the titration curve of benzene-1,2,4-triphosphonic acid with and without added zinc ions.

FIG. 19 shows a similar pair of titration curves for benzene-1,2,4-triphosphonic acid with and without added zinc nitrate. At the end of the titration with NaOH, zinc nitrate was added, and the solution titrated back with HCl. Addition of zinc caused cloudiness and a drop in pH, presumably due to formation of $Zn(OH)_2$. Notable here is that buffering at pH 4-6, completely absent from the curve of the pure triacid, is present in the presence of zinc.

The experimental results establish that phosphonic acids of appropriate structure offer stability to oxidants combined with a range of available buffered regions from pH 2 to pH 10. The results also establish that polyphosphonic acids of appropriate structure offer not only stability toward oxidation, but tunability in their buffering range via addition of various metal ions. As a whole, the present invention thus provides methods for buffering reactive, highly oxidizing solutions at almost any desired pH. Furthermore, it is apparent that the pH buffering range of phosphonate buffers of the invention can be "stretched" to a wider span of pH values through the addition of multiple metal ions.

The invention provides skin- and surface-cleansing antimicrobial compositions, having a pH from 3.0 to 7.0, comprising water, hypochlorous acid, one or more buffers according to the invention, and optionally, a surfactant that is storage-stable in the presence of hypochlorous acid at the pH of the composition. The buffers of the invention stabilize the pH of the compositions within a pH range of 3.0 to 7.0, preferably 4.0 to 6.0, and more preferably from 4.5 to 5.5. The compositions preferably have a concentration of chloride that, measured as % w/v sodium chloride, is less than about 0.5% w/v, more preferably less than about 0.2% w/v, still more preferably less than about 0.1%, and even more preferably less than about 0.05% w/v. Even more preferably, the amount of chloride, as sodium chloride, is less than 0.02% w/v, corresponding to about 120 ppm chloride per se. Most preferably, the concentration of chloride is less than 100 ppm.

The compositions of the invention may contain between 5 and 1500 mg HOCl per liter, and preferably contain between 15 and 800 mg per liter. More preferred embodiments contain between 50 and 500 mg per liter. As can be seen by inspection of FIG. 1, the concentration of HOCl relative to other species reaches a maximum at about pH 5.0. (FIG. 1 presents a first-order approximation; more detailed calculations, taking into account all significant equilibria in such solutions, are disclosed in U.S. Patent Application publication No. 2014/0134224.) Since the active antimicrobial agent is HOCl, maximum effectiveness will be associated with a maximum concentration of this species; thus, the preferred buffers will stabilize the pH at a value between 3.0 and 7.0, more preferably between 4.0 and 6.0, and most preferably between 4.5 and 5.5. The practitioner may choose to vary the pH within these ranges in order to optimize other properties, such as storage stability, non-irritancy, or cleaning efficiency.

The invention further provides chlorine-impermeable and chlorine-resistant packages, containing the above compositions and articles. In preferred embodiments, the packages have substantially zero headspace. As used herein, "substantially zero headspace" refers to a headspace volume that is less than about 5% of the volume of the package. In certain embodiments, the package is collapsible, or is otherwise adapted to retain substantially zero headspace as the composition is dispensed or the articles removed. In other embodiments, the package contains a single-use dose or volume of a composition of the invention, or a single article of the invention.

(B) Wipes

The invention also provides an environmental surface-cleansing and/or skin-cleansing antimicrobial article, in the form of a woven or non-woven fabric wipe, which is moistened or saturated with one of the antimicrobial compositions of the invention. The wiping articles may be discs or pads of woven or non-woven, preferably hydrophilic fabric, or may be formed from a hydrophilic polymer foam.

The wiping articles, colloquially known as "wet wipes", may be of the general physical form described in, for example, U.S. Pat. Nos. 4,891,228 and 5,888,524. The antimicrobial wet wipes of the invention may take any of the several different forms know in the art. For example, the wet wipes may be in the form of a stack of moistened sheets which have been packaged in a jar or flexible packet. The wipes may be in a folded or unfolded configuration. In addition, the wipes may be in the form of continuous webs of material which include perforations to separate the individual wet wipes from the continuous web. Such continuous webs may be wound into rolls and also packaged in plastic containers. The wipes can be used, for example, as baby wipes, hand wipes, household cleaning wipes, and hospital and industrial wipes.

Materials suitable for the antimicrobial wet wipe of the present invention are well known to those skilled in the art. The wet wipe can be made from any material suitable for use as a moist wipe, including meltblown, spun-bonded, coform, air-laid, and carded thermobonded web materials, hydroentangled materials and the like. The wet wipe may have a basis weight of from about 25 to about 120 grams per square meter and desirably from about 40 to about 90 grams per square meter. The wipes are preferably formed from materials that are storage-stable in the presence of chlorine and hypochlorous acid, at the pH of the composition being employed. "Storage-stable", in this context, means that the wipes remain usable for their intended purpose for a period of at least 12 months at room temperature. Preferred polymers for storage-stable wipes are free of groups which are subject to chlorination, such as olefin, amino, amido NH, and hydroxyl groups.

Suitable articles may be formed, for example, from woven or non-woven wettable polyolefin or polyester fibers, modified with hydrophilic monomers or having a hydrophilic surface treatment. Other polymers suitable for inclusion in the fibers include, but are not limited to, polyacrylic acid (PAAc), polyethylene oxide (PEO), polyethersulfone (PES), and blends and copolymers thereof. Normally hydrophobic polymers may be rendered wettable by methods known in the art, such as are described in U.S. Pat. No. 5,614,574.

By way of example, coform basesheets may comprise a gas-formed matrix of thermoplastic polymeric meltblown microfibers, such as, for example, polypropylene microfibers, and hydrophilic fibers as described above. The relative percentages of the polypropylene microfibers and hydrophilic fibers in the coform basesheet can vary over a wide range depending on the desired characteristics of the wipes. For example, the coform basesheet may comprise from about 20 to about 60 weight percent, and more desirably from about 30 to about 40 weight percent of polypropylene microfibers based on the dry weight of the coform basesheet being used to provide the wipe. Again by way of example, wipes can be made from meltblown or spunbond polyolefin or polyester sheets having a basis weight of from about 25 to about 120 grams per square meter. The preferred sheet materials are woven or non-woven PET, and various wettable variations thereof.

The wet wipes are saturated or otherwise impregnated with an antimicrobial composition of the present invention. The amount of the antimicrobial composition added to the wipes will vary depending upon the type of material being used to provide the wipe, the type of container being used to store the wipes, and the desired end use of the wipes. Generally, each wipe can contain from about 150 to about 600 weight percent and desirably from about 250 to about 450 weight percent of the antimicrobial composition based on the dry weight of the wipe. In a particular aspect wherein the wet wipe is made from a coform material comprising from about 30 to about 40 weight percent polymeric microfibers based on the dry weight of the wipe, the amount of the antimicrobial composition contained within the wet wipe is from about 300 to about 400 weight percent and desirably about 330 weight percent based on the dry weight of the wet wipe. If the amount of liquid is less than the above-identified range, the wet wipe may be too dry to moisten the surface being wiped, and may not adequately perform. In certain embodiments, the wipes are simply saturated with, and optionally immersed in a slight excess of, the HOCl composition, and the container is sealed with zero or substantially zero headspace.

In an alternative embodiment of the invention, the wipes are provided in a container in a dry state, and the consumer is provided with an antimicrobial HOCl solution of the invention in a separate container. The wet wipes of the invention are prepared in situ, by pouring the solution over the wipes. The container for the wipes in this embodiment may have a reduced level of chlorine resistance and impermeability, as the wipes will require containment only until they are used up.

(C) Packaging

The elemental chlorine created according to Eqn. 1, if kept in solution and prevented from escaping, will remain at equilibrium concentration, and can thereby prevent the reaction from proceeding to the right. For this reason, chlorine-impermeable and chlorine-resistant packaging is preferred for the compositions and articles of the invention. The packaging preferably is characterized by having zero, or substantially zero, headspace, so as to minimize the volume of gas into which chlorine could escape from solution during storage. In certain embodiments, the package may be a glass or polymer bottle or jar. In alternative embodiments, the package may be a collapsible pouch, with a resealable opening. The package may also take the form of a single-use tear-open pouch.

Tear-open pouches are preferably formed from a polymer, multi-polymer laminate, or polymer-metal laminate. The polymer, or at least one polymer in a laminate, is preferably chlorine-resistant and chlorine-impermeable, and compatible with lamination processes such as co-extrusion. There is relatively little data on the chlorine permeability of polymer films, but chlorine, like oxygen, is a small, neutral, diatomic molecule, and is expected to have similar diffusion properties, albeit with a roughly 30% slower diffusion rate (per Graham's Law) due to its greater molecular weight. Thus, in general, polymers and materials that provide oxygen barrier functionality are expected to have chlorine-barrier functionality as well, and—provided that they are unreactive with chlorine—such materials are expected to be useful in the present invention. Oxygen diffusion rates through polymer films can be measured by known methods; see for example Rharbi, Y.; Yekta, A.; Winnik, M. A.; *A Method for Measuring Oxygen Diffusion and Oxygen Permeation in Polymer Films Based on Fluorescence Quenching*, Anal. Chem. 1999, 71, 5045-5053. Because of its importance to food-packaging technology, there are numerous reference volumes that list oxygen transmission rates for a wide variety of commercially-available polymers. Values for the Oxygen Transmission Rate (OTR) of exemplary polymers are presented in Table 1; the values for the Chlorine Transmission Rate (CTR) are expected to vary similarly and in similar proportions.

The OTR values in Table 1 represent the volume of oxygen (in ml) that will diffuse through 100 square inches of a 1-mil film, over the course of 24 hours at room temperature and atmospheric pressure. Table 2 illustrates the considerable advantages of high-barrier polymers over ordinary polyethylene (LDPE) and polypropylene containers:

TABLE 1

Oxygen barrier comparison of representative polymers

| Material | OTR @ 25° C. (ml-mil/100 in$^2$-24 hr-atm) |
|---|---|
| Silica-coated PET | 0.002-0.07 |
| EVOH (dry) | 0.01 |
| EVOH (coextruded) | 0.04-1.07 |
| PVdC | 0.07 |
| MXD6 (dry) | 0.15 |
| MXD6 (coextruded) | 0.25 |
| Polyacrylonitrile | 1.0 |
| PEN | 1.2 |
| PET (amorphous) | 1.0 |
| PET (oriented) | 3.0-5.0 |
| Nylon (amorphous) | 1.5-2.4 |
| LDPE | 420 |
| HDPE | 150 |
| Polypropylene | 150 |
| Polystyrene | 350 |

Ethylene vinyl alcohol copolymer (EVOH), polyvinylidene dichloride (PVdC), vinylidene dichloride/vinyl chloride copolymer (SARAN™ film), polyacrylonitrile, polyethylene naphthalate (PEN), metaxylylene nylon-6 (MDX6) and nylon-6 nanocomposite (MXD6-NC) are examples of particularly effective oxygen barrier polymers that may be used in the present invention. Oriented and amorphous polyethylene terephthalate (PET) and oriented and amorphous nylon are also expected to be suitable. Cyclic olefin polymers and copolymers (COP and COC) available from Topas Advanced Polymers (Florence, Ky.) represent another class of similarly suitable materials. Polychlorotrifluoroethylene (CTFE), available under the trade name ACLAR™ (Honeywell International Inc., Morristown, N.J.) is one example of a material having desirable chlorine resistance; another is ETFE, available under the trade name TEFZEL™ (DuPont Inc., Wilmington, Del.). PTFE (TEFLON™, DuPont) offers superb chemical resistance to chlorine, but it exhibits permeability comparable to that of polystyrene, and is a poor barrier if used alone. Particularly suitable barrier films are laminates of two or more of the above materials, such as the PENTAPHARM™ ACLAR™ G03 and G04 laminate films available from Klöckner Pentaplast (Gordonsville, Va.). An internal coating of silica (see PCT patent application publication No. WO 2013/071138), or an external coating of crosslinked vinyl alcohol-vinyl amide copolymer, as described in U.S. Patent application publication No. US 2010/0255326, may be applied to provide enhanced gas barrier properties. Amide-based resins should be regarded as less desirable for the interior surface of laminates, due to the potential for degradation due to formation of N-chloroamides. Polyvinyl alcohol-based resins are likewise less desirable, due to the potential for formation of alkyl hypochlorites. Preferred materials are polyolefins, polyesters, and fluoro- and chloro-olefin polymers that are lacking in chlorine-reactive functional groups.

Metal foil laminates may be employed, provided that the metal is resistant, or can be rendered resistant, to attack by chlorine. Metals inert to chlorine are few in number; among them are gold, platinum, and palladium. Silver, nickel and tantalum, while they do react with chlorine, develop a protective metal chloride surface coating, and may be considered inert for the purposes of this invention. Methods for laminating gold foil with polymers are known; see for example U.S. Pat. No. 5,702,554. Titanium, tantalum, nickel, and nickel-chromium alloys (NICONEL™) are also suitable, if provided with a protective oxide coating, and are economically more viable than the precious metals, but they are less amenable to vapor deposition.

Aluminum is almost universally employed in tear-open pouches, due to its low cost, ease of handling, and gas barrier and light-blocking properties, but it is highly reactive toward chlorine. Surprisingly, the inventors have discovered that it is possible to use aluminum in the packaging of the invention, if it is coated with (or deposited on) an effective moisture- and chlorine-resistant polymer. This is thought to be due to the exclusion of moisture, which would allow formation of a protective metal halide barrier, similar to those formed by nickel and silver.

Examples of multi-layer flexible films having low oxygen permeability are described in, for example, U.S. Pat. Nos. 8,029,885 and 8,486,501, U.S. Patent Application publication No. 2012/0271270, and in the references contained therein. Films having alternating layers of polymer and clay nanoparticles provide excellent gas barrier properties, and are also suitable for use in the present invention (see, e.g., M. Priolo et al, *Nano Lett.*, 2010, 10 (12), pp 4970-4974.) Preferably the innermost layer is a gas barrier polymer such as LLDPE or oriented PET, selected for its chemical resistance to chlorine and HOCl. This is welded or adhered via a tie layer to the next layer of the film, which may be a polymer or may be a metal foil such as aluminum, which serves as a gas barrier against loss of chlorine. For the greatest level of resistance, this optional foil layer may be formed from silver or gold. As is known in the art, metallic foils in laminated films need only be thick enough to reliably have few or no detectable pinholes, typically 0.005 to 0.01 mm in thickness. The outermost layer may also be a polymer layer, and will typically be chosen for its mechanical strength and/or the ability to accept printing. In one preferred embodiment, the inner layer is LLDPE, and the gas barrier layer is 0.007 mm aluminum foil, adhered by an ethylene-acrylic acid copolymer based tie layer, such as that marketed by Glenroy Inc. (Menomonee Falls, Wis.) under the trade name GRX™ The outer layer may be a printable, coated PET, tied to the aluminum with extruded LDPE. A suitable example of this construction is the laminate sold by Glenroy Inc. with product number EFS 145-001. The aluminum in this laminate has been found to be surprisingly resistant to degradation by aqueous solutions of free active chlorine.

Those of skill in the art will appreciate that there are obvious variations and modifications to the described invention and the examples provided above, that are within the ability of one of ordinary skill in the art to conceive and carry out. Such obvious variations and modifications are intended to be within the scope of the invention, the exclusive rights to which are limited only by the scope of the following claims.

We claim:

1. A buffered aqueous solution of hypochlorous acid, having a concentration of hypochlorous acid between 50 ppm and 1000 ppm and having a pH buffered in the range of 3 to 7, comprising an effective buffering amount of a soluble salt of a phosphonic acid of formula I

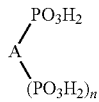

wherein A is selected from the group consisting of aromatic rings, $C_5N$ $C_4N_2$ and $C_3N_3$ heteroaromatic rings, and $C_1$-$C_{10}$ alkyl groups; and wherein n is 0-5 when A is aromatic;
n is 0-4 when A is $C_5N$ heteroaromatic;
n is 0-3 when A is $C_4N_2$ heteroaromatic or $C_1$-$C_{10}$ alkyl; and
n is 0-2 when A is $C_3N_3$ heteroaromatic.

2. The solution of claim 1, wherein the phosphonic acid has formula II

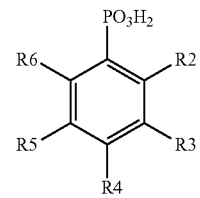

and wherein R2 through R6 are each independently selected from the group consisting of H, F, Cl Br, $CF_3$, $SO_3H$, $CF_2PO_3H_2$, and $PO_3H_2$.

3. The solution of claim 2, wherein at least one of R2 through R6 is $PO_3H_2$.

4. The solution of claim 1, wherein the phosphonic acid has formula III

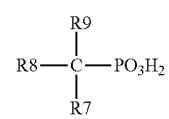

and wherein R7 through R9 are each independently selected from the group consisting of F, Cl, $C_1$-$C_9$ alkyl, perfluoro-$C_1$-$C_9$ alkyl, aryl, $PO_3H_2$, $CF_2PO_3H_2$, $CF_2$ $CF_2PO_3H_2$, $CCl_2PO_3H_2$, $CFCF_3PO_3H_2H$, and $CFClPO_3H_2$.

5. The solution of claim 4, wherein at least one of R7 through R9 is $PO_3H_2$.

6. The solution according to claim 1, having less than 100 ppm chloride.

7. The solution according to claim 2, having less than 100 ppm chloride.

8. The solution according to claim 4, having less than 100 ppm chloride.

9. A disposable wiping article impregnated with a solution according to claim 1.

10. A disposable wiping article impregnated with a solution according to claim 2.

11. A disposable wiping article impregnated with a solution according to claim 4.

12. A disposable wiping article impregnated with a solution according to claim 6.

13. A disposable wiping article impregnated with a solution according to claim 7.

14. A disposable wiping article impregnated with a solution according to claim 8.

* * * * *